United States Patent
Ochiai et al.

(10) Patent No.: US 6,768,531 B2
(45) Date of Patent: Jul. 27, 2004

(54) LIQUID CRYSTAL DISPLAY DEVICE

(75) Inventors: Takahiro Ochiai, Mobara (JP); Kikuo Ono, Mobara (JP); Ryutaro Oke, Mobara (JP); Kazuhiko Yanagawa, Mobara (JP)

(73) Assignee: Hitachi, Ltd., Tokyo (JP)

( * ) Notice: Subject to any disclaimer, the term of this patent is extended or adjusted under 35 U.S.C. 154(b) by 165 days.

(21) Appl. No.: 10/173,012

(22) Filed: Jun. 18, 2002

(65) Prior Publication Data

US 2003/0025857 A1 Feb. 6, 2003

(30) Foreign Application Priority Data

Jul. 31, 2001 (JP) ........................................ 2001-231333

(51) Int. Cl.[7] ........................ G02F 1/1335; G02F 1/137
(52) U.S. Cl. ........................ 349/141; 349/106; 349/122; 349/138
(58) Field of Search ................................ 349/141, 106, 349/108, 107, 122, 138, 43

(56) References Cited

U.S. PATENT DOCUMENTS 6,504,591 B1 * 1/2003 Kondo et al. ............... 349/123

2002/0101557 A1 * 8/2002 Ono et al. ................... 349/143

FOREIGN PATENT DOCUMENTS

EP 0 413 390 A2 8/1990

* cited by examiner

*Primary Examiner*—Kenneth Parker
*Assistant Examiner*—Tai Duong
(74) *Attorney, Agent, or Firm*—Reed Smith LLP; Stanley P. Fisher, Esq.; Juan Carlos A. Marquez, Esq.

(57) ABSTRACT

A pair of electrodes which constitute an upper layer and a lower layer with respect to an interlayer insulation film are formed as different layers at respective pixel regions on a liquid-crystal-side surface of one substrate out of respective substrates which are arranged to face each other in an opposed manner by way of liquid crystal. At two pixel regions which are selected from the respective pixel regions, the height of background layers on which the electrodes which constitute the lower layers with respect to the interlayer insulation films are formed differs with respect to a surface of one substrate. The film thickness of the interlayer insulation film is set small with respect to the high background layer out of respective background layers which differ in height and is set large with respect to the low background layer out of respective background layers which differ in height.

8 Claims, 12 Drawing Sheets

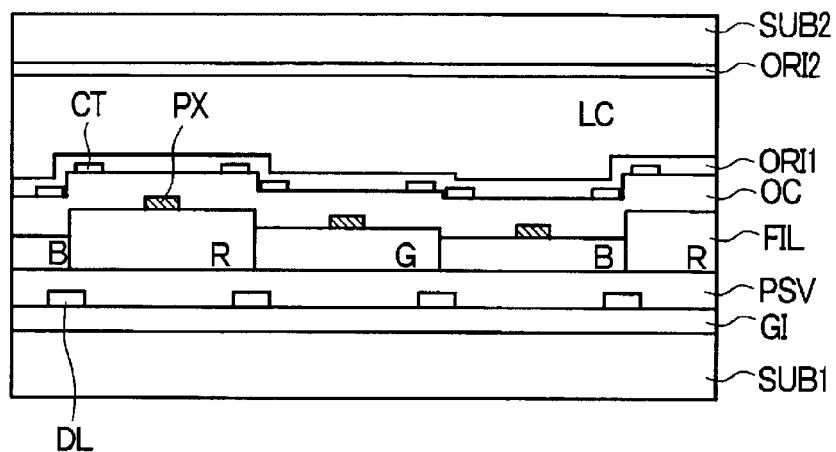
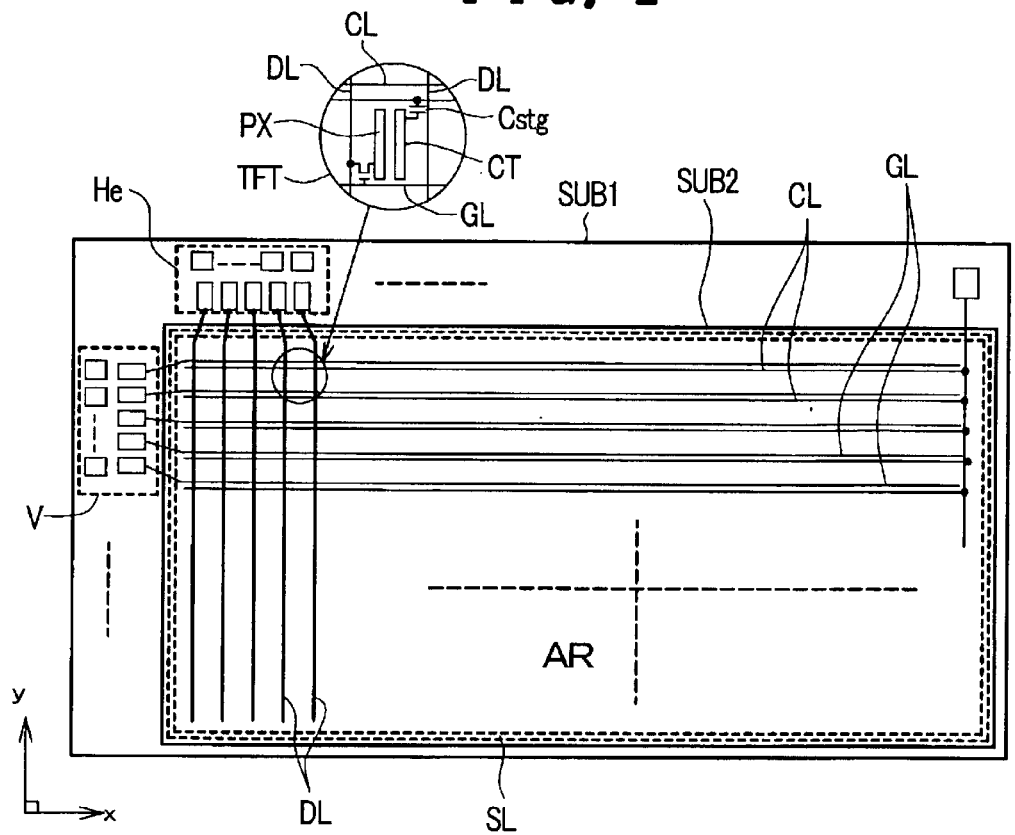

LIQUID CRYSTAL DISPLAY DEVICE

BACKGROUND OF THE INVENTION

1. Field of the Invention

The present invention relates to a liquid crystal display device, and more particularly to a so-called lateral electric field type liquid crystal display device.

2. Description of the Related Art

In a so-called lateral electric field type liquid crystal display device, on each pixel region on a liquid-crystal-side surface of one substrate out of respective substrates which are arranged to face each other in on opposed manner by way of liquid crystal, a pixel electrode and a counter electrode which generates an electric field between the pixel electrode and the counter electrode are formed, and the light transmittance of the liquid crystal is controlled by components of the electric field substantially parallel to the substrates.

In such a liquid crystal display device adapted to an active matrix type, on the liquid-crystal-side surface of the above-mentioned one substrate, regions which are surrounded by gate signal lines which are extended in the x direction and are arranged in parallel in the y direction and the drain signal lines which are extended in the y direction and are arranged in parallel in the x direction are formed as pixel regions, and a switching element which is operated in response to scanning signals from the gate line, a pixel electrode to which video signals are supplied from the drain signal lines through the switching element and a counter electrode which is arranged in a spaced-apart manner from the pixel electrode are formed on each pixel region.

Then, in performing the color display, there has been known a liquid crystal display device having the structure in which color filters are formed on the above-mentioned one substrate side and the color filters are not formed on the other substrate side. Such a structure is devised to reduce the influence of the displacement of alignment of the other substrate to one substrate to cope with the recent demand for high definition.

SUMMARY OF INVENTION

However, in the liquid crystal display device having such a constitution, the layer thickness is not made uniform over all color filters of red (R), green (G) and blue (B).

Such a situation occurs when the layer thickness of respective color filters are intentionally set to different values to attain the balance of transmittance or color purity among respective color filters of R, G and B or when the layer thickness is not made uniform over all color filters of red (R), green (G) and blue (B) due to the irregularities in manufacturing the color filters.

In these cases, when the pixel electrodes and the counter electrodes are formed by way of an interlayer insulation film on upper layers of the color filters, the height of the interlayer insulation film with respect to a surface of one substrate is reflected on the layer thickness of the color filters so that the respective heights of the pixel electrodes or the counter electrodes (heights from the surface of one substrate) differ.

This makes the layer thickness of the liquid crystal at respective pixels non-uniform so that the equal light transmittance cannot be obtained with respect to the respective color pixels.

Further, when the interlayer insulation film which is interposed between the pixel electrodes and the counter electrodes is made of resin material or the like which is formed by coating, the thickness of the interlayer insulation film differs depending on the respective pixels of different colors. Accordingly, the voltage drop which differs depending on the interlayer insulation film between the pixel electrodes and the counter electrodes displaces brightness-voltage characteristics thus leading to the collapsing of the color balance of the intermediate gray scale.

The present invention has been made in view of these circumstances and it is an object of the present invention to provide a liquid crystal display device which can enhance the display quality.

To briefly explain the summary of the typical inventions among the inventions disclosed in this specification, they are as follows.

Means 1.

A liquid crystal display device according to the present invention is, for example, characterized in that:

a pair of electrodes which constitute an upper layer and a lower layer with respect to an interlayer insulation film are formed as different layers at respective pixel regions on a liquid-crystal-side surface of one substrate out of respective substrates which are arranged to face each other in an opposed manner by way of liquid crystal, at two pixel regions which are selected from the respective pixel regions, the heights of background layers on which the electrodes which constitute the lower layers with respect to the interlayer insulation films differ with respect to a surface of one substrate, and the film thickness of the interlayer insulation film is set small with respect to the high background layer out of the respective background layers which differ in height and is set large with respect to the low background layer out of the respective background layers.

Means 2.

A liquid crystal display device according to the present invention is, for example, characterized in that:

a pair of electrodes which constitute an upper layer and a lower layer with respect to an interlayer insulation film are formed on at least color filters as different layers at respective pixel regions on a liquid-crystal-side surface of one substrate out of respective substrates which are arranged to face each other in an opposed manner by way of liquid crystal from the one substrate side, at two pixel regions which are selected from the respective pixel regions and on which two color filters of different colors are formed, the heights of surfaces of the color filters differ with respect to a surface of one substrate, and the film thickness of the interlayer insulation film is set to satisfy a following formula (1).

0<film thickness difference of the interlayer insulation film between pixel regions<film thickness difference of the color filters between pixel regions     (1)

Means 3.

A liquid crystal display device according to the present invention is, for example, characterized in that:

a pair of electrodes which constitute an upper layer and a lower layer with respect to an interlayer insulation film are formed on at least color filters as different layers at respective pixel regions on a liquid-crystal-side surface of one substrate out of respective substrates which are arranged to face each other in an opposed manner by way of liquid crystal from the one substrate side, at two pixel regions which are selected from the respective pixel regions and on which two color filters of different colors are formed, the heights of surfaces of the color filters differ with respect to a surface of one substrate, and the film thickness of the interlayer insulation film is set to satisfy a following formula (2).

¼×film thickness difference of color filter between pixel regions<film thickness difference of interlayer insulation film between pixel regions, <¾×film thickness difference of color filter between pixel regions (2)

Means 4.

A liquid crystal display device according to the present invention is, for example, based on the constitution of the means 2 or 3, characterized in that the film thickness of the interlayer insulation film is set to satisfy a following formula (3).

film thickness of interlayer insulation film<½ times film thickness of thickest color filter (3)

Means 5.

A liquid crystal display device according to the present invention is, for example, based on the constitution of the means 2 or 3, characterized in that the film thickness of the interlayer insulation film is set to satisfy a following formula (4).

¼ times film thickness of thinnest color filter<film thickness of interlayer insulation film<½ times film thickness of thickest color filter (4)

Means 6.

A liquid crystal display device according to the present invention is, for example, characterized in that:

a pair of electrodes which constitute an upper layer and a lower layer with respect to an interlayer insulation film are formed as different layers at respective pixel regions on a liquid-crystal-side surface of one substrate out of respective substrates which are arranged to face each other in an opposed manner by way of liquid crystal, at the respective pixel regions, the heights of background layers on which the electrodes which constitute the lower layers with respect to the interlayer insulation films are formed differ with respect to a surface of one substrate, and the film thickness of the interlayer insulation film is set small with respect to the high background layer out of the respective background layers which differ in height and is set large with respect to the low background layer out of the respective background layers which differ in height.

Means 7.

A liquid crystal display device according to the present invention is, for example, characterized in that:

at respective pixel regions on a liquid-crystal-side surface of one substrate out of respective substrates which are arranged to face each other in an opposed manner by way of liquid crystal, a pair of electrodes are formed by way of a protective film which is formed by sequentially laminating a first protective film and a second protective film, the respective electrodes are arranged in a spaced-apart manner in a plan view so as to generate an electric field between the electrodes, the relationship between the film thicknesses $d_3$, $d_2$ of the first protective film and the second protective film on the electrode arranged as a layer below the protective film and the film thicknesses $d_3'$, $d_2'$ of the first protective film and the second protective film on a region between the pair of electrodes satisfies a following formula (5)

$$d_3 \equiv d_3', \ d_2 < d_2' < d_2 + d_4 \quad (5), \text{ and}$$

the relationship between the layer thickness $d_1$ of liquid crystal on the electrode arranged below the protective film and the layer thickness $d_1'$ of the liquid crystal on the region between the pair of electrodes satisfies a following formula (6).

$$d_1 \equiv d_1' \ (\text{here}, d_1 \leq d_1') \quad (6)$$

Means 8.

A liquid crystal display device according to the present invention is, for example, characterized in that:

at respective pixel regions formed on a liquid-crystal-side surface of one substrate out of respective substrates which are arranged to face each other in an opposed manner by way of liquid crystal, a pair of electrodes are formed by way of a protective film which is formed by sequentially laminating a first protective film and a second protective film, the respective electrodes are arranged in a spaced-apart manner in a plan view so as to generate an electric field between the electrodes, and in two selected pixel regions, assuming the film thickness of the first protective film in one pixel region as $x_3$, the film thickness of the second protective film in one pixel region as $x_2$, the film thickness of the first protective film in the other pixel region as $y_3$ and the film thickness of the second protective film in the other pixel region as $y_2$, a following formula (7) is established.

$$x_2 + x_3 \equiv y_2 + y_3, \ x_3 > y_3, \ x_2 < y_2 \quad (7)$$

Further, when the distance from the substrate to the liquid crystal layer differs, the thickness of the liquid crystal layer differs. In the lateral electric field method, the driving voltage depends on the thickness of the liquid crystal layer. That is, the thicker the liquid crystal layer, the same brightness can be obtained with the lower voltage. On the other hand, this implies that a B-V curve differs between two pixels where the distance from the substrate to the liquid crystal layer differs from each other and hence, the same gray scale cannot be displayed using the equal voltage. Followings are respectively means which can solve such a drawback.

(Means 9)

A liquid crystal display device according to the present invention, for example, comprises;

a liquid crystal layer which is sandwiched between a pair of substrates which face each other in an opposed manner, a plurality of pixel regions, and pixel electrodes and counter electrodes which are formed on each pixel region on a liquid-crystal-layer-side surface of one substrate out of the pair of substrates, wherein each pixel region includes a first pixel and a second pixel respectively having the plurality of counter electrodes formed thereon, the distance from one substrate to the counter electrodes at the first pixel is set longer than the distance at the second pixel, and the distance between the plurality of counter electrodes in the pixel at the first pixel is set shorter than the distance at the second pixel.

(Means 10)

A liquid crystal display device according to the present invention, for example, comprises;

a liquid crystal layer which is sandwiched between a pair of substrates which face each other in an opposed manner, a plurality of pixel regions, and pixel electrodes and counter electrodes which are formed on each pixel region on a liquid-crystal-layer-side surface of one substrate out of the pair of substrates, wherein each pixel region includes a first pixel and a second pixel respectively having the plurality of pixel electrodes formed thereon, the distance from one substrate to the pixel electrodes at the first pixel is set longer than the distance at the second pixel, and the distance between the plurality of pixel electrodes in the pixel at the first pixel is set shorter than the distance at the second pixel.

(Means 11)

A liquid crystal display device according to the present invention, for example, comprises;

a liquid crystal layer which is sandwiched between a pair of substrates which face each other in an opposed manner, a plurality of pixel regions, and pixel electrodes and counter electrodes which are formed on each pixel region on a liquid-crystal-layer-side surface of one substrate out of the pair of substrates, wherein each pixel region includes a first pixel and a second pixel which differ in the distance from one substrate to the counter electrodes, the distance from one substrate to the counter electrodes at the first pixel is set longer than the distance at the second pixel, and the distance between the pixel electrodes and the counter electrodes at the first pixel is set shorter than the distance at the second pixel.

(Means 12)

A liquid crystal display device according to the present invention is, for example, based on the constitution of the means 11, characterized in that the pixel electrodes and the counter electrodes are constituted as separate layers.

(Means 13)

A liquid crystal display device according to the present invention is, for example, based on the constitution of the means 11, characterized in that the pixel electrodes and the counter electrodes are constituted as the same layer.

(Means 14)

A liquid crystal display device according to the present invention is, for example, based on the constitution of the means 9, characterized in that the counter electrodes are formed on an organic film.

(Means 15)

A liquid crystal display device according to the present invention is, for example, based on means 10, characterized in that the pixel electrodes are formed on an organic film.

(Means 16)

A liquid crystal display device according to the present invention is, for example, based on the constitution of the means 13, characterized in that the pixel electrodes and the counter electrodes are formed on an organic film.

(Means 17)

A liquid crystal display device according to the present invention, for example, comprises;

a liquid crystal layer which is sandwiched between a pair of substrates which face each other in an opposed manner, a plurality of pixel regions, and pixel electrodes and counter electrodes which are formed on each pixel region on a liquid-crystal-layer-side surface of one substrate out of the pair of substrates, wherein each pixel region includes a first pixel and a second pixel which differ in the difference between the distance between one substrate and the pixel electrodes and the distance between one substrate and the counter electrodes, the difference at the first pixel is smaller than the difference at the second pixel, the distance between one substrate and the pixel electrodes at the first pixel is larger than the distance between one substrate and the pixel electrodes at the second pixel, and the distance between one substrate and the counter electrodes at the first pixel is larger than the distance between one substrate and the counter electrodes at the second pixel.

(Means 18)

A liquid crystal display device according to the present invention is, for example, based on the constitution of the means 17, characterized in that the pixel electrodes and the counter electrodes are formed as different layers by way of an organic film.

(Means 19)

A liquid crystal display device according to the present invention is, for example, based on the constitution of any one of the means 14 to 16 or 18, characterized in that the organic film is constituted of color filters.

(Means 20)

A liquid crystal display device according to the present invention is, for example, based on the constitution of any one of the means 9 to 11 or 17, characterized in that the first pixel and the second pixel are arranged close to each other.

Further means according to the present invention will become apparent from the description of this specification and attached drawings.

BRIEF DESCRIPTION OF THE DRAWINGS

FIG. 1 is a cross-sectional view showing one embodiment of a liquid crystal display device according to the present invention.

FIG. 2 is an overall equivalent circuit diagram showing one embodiment of the liquid crystal display device according to the present invention.

DESCRIPTION OF THE PREFERRED EMBODIMENTS

Figure 3:
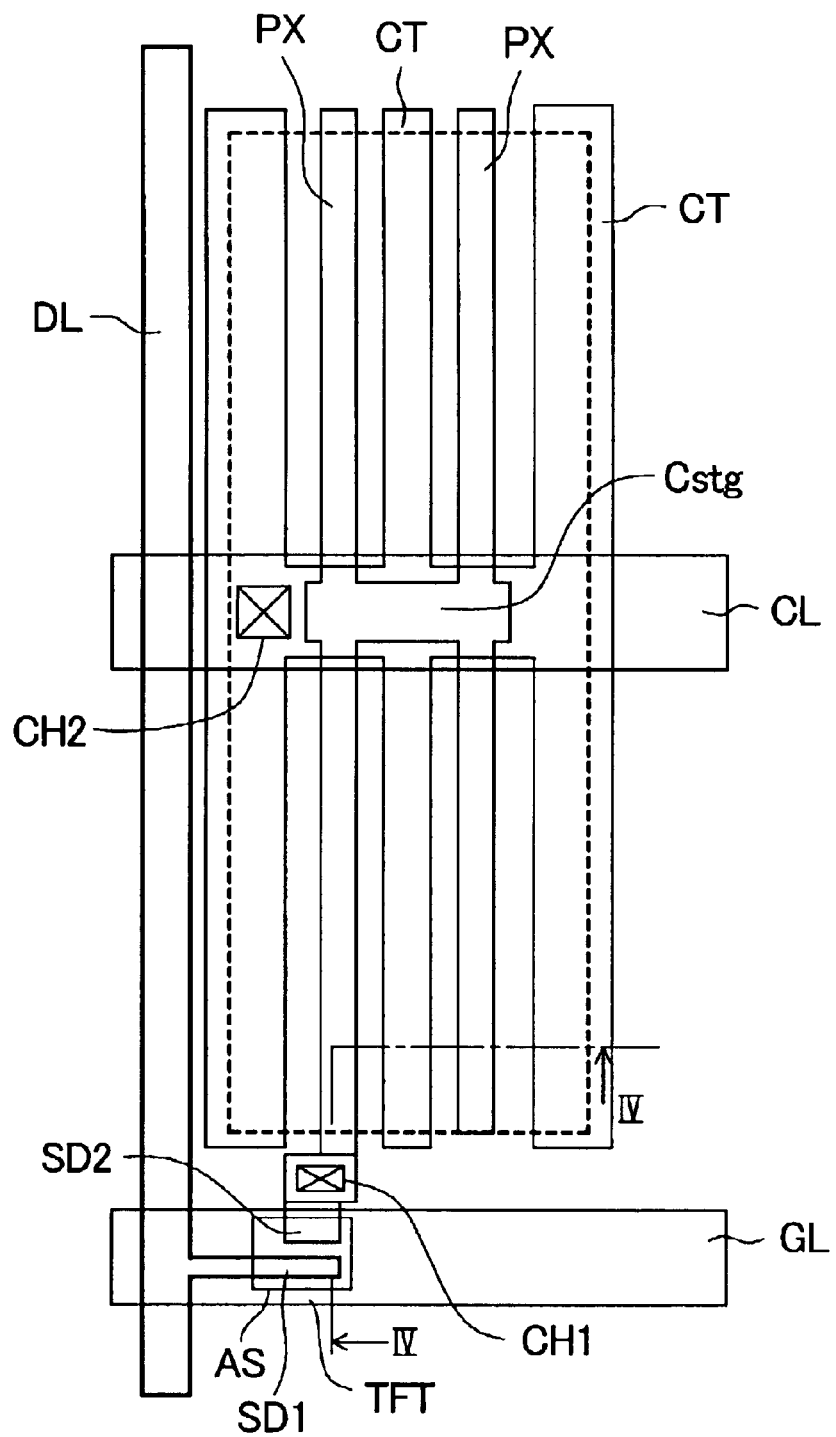
FIG. 3 is a plan view showing one embodiment of a pixel of the liquid crystal display device according to the present invention.

Preferred embodiments of a liquid crystal device according to the present invention are explained herein after in conjunction with attached drawings.

Embodiment 1

<Equivalent Circuit>

FIG. 2 is an overall equivalent circuit diagram showing one embodiment of a liquid crystal display device according to the present invention. Although the drawing shows the equivalent circuit, it is depicted corresponding to an actual geometrical arrangement.

In FIG. 2, a pair of transparent substrates SUB1, SUB2 which are arranged to face each other in an opposed manner by way of liquid crystal are provided. The liquid crystal is sealed by a sealing member SL which is also served for fixing the other transparent substrate SUB2 to one transparent substrate SUB1.

On a liquid-crystal-side surface of the above-mentioned one transparent substrate SUB1 which is surrounded by the sealing member SL, gate signal lines GL which are extended in the x direction and are arranged in parallel in the y direction and drain signal lines DL which are extended in the y direction and are arranged in parallel in the x direction are formed.

Regions which are surrounded by respective gate signal lines GL and respective drain signal lined DL constitute pixel regions and a mass of these respective pixel regions in a matrix array constitutes a liquid crystal display part AR.

Common counter voltage signal lines CL which run in the inside of respective pixel regions are formed on respective pixel regions which are arranged in parallel in the x direction. These counter voltage signal lines CL constitute signal lines for supplying signal voltages which become the reference with respect to video signals to counter electrodes CT of respective pixel regions which will be explained later.

On each pixel region, a thin film transistor TFT which is operated in response to scanning signals from one-side gate signal line GL and a pixel electrode PX to which the video signals are supplied from the one-side drain signal line DL through the thin film transistor TFT are formed.

The pixel electrode PX generates an electric field between the pixel electrode PX and the counter electrode CT which is connected to the counter voltage signal line CL and the light transmittance of the liquid crystal is controlled based on the electric field.

Respective ends of the gate signal lines GL are extended over the sealing member SL and the extended ends constitute terminals to which output terminals of a vertical scanning driving circuit V are connected. Further, to input terminals of the vertical scanning driving circuit V, signals from a printed circuit board which is arranged outside a liquid crystal display panel are inputted.

The vertical scanning driving circuit V is constituted of a plurality of semiconductor devices, wherein a plurality of gate signal lines GL which are arranged close to each other are formed into a group and one semiconductor device is allocated to every group.

In the same manner, respective ends of the drain signal lines DL are extended over the sealing member SL and the extended ends constitute terminals to which output terminals of a video signal driving circuit He are connected. Further, to input terminals of the video signal driving circuit He, signals from the printed circuit board which is arranged outside the liquid crystal display panel are inputted.

The video signal driving circuit He is also constituted of a plurality of semiconductor devices, wherein a plurality of drain signal lines DL which are arranged close to each other are formed into a group and one semiconductor device is allocated to every group.

The counter voltage signal lines CL each of which is provided in common with respect to respective pixel regions arranged in parallel in the x direction have right-side end portions thereof in the drawing connected in common and the connection line is extended over the sealing member SL and the extended end constitutes a terminal CTM. A voltage which becomes the reference with respect to the video signals is supplied from this terminal CTM.

With respect to the above-mentioned respective gate signals lines GL, these gate signal lines GL is sequentially selected one by one in response to the video signal from the vertical scanning circuit V.

Further, the liquid crystal display device is configured such that the video signals are supplied to respective drain signal lines DL from the video signal driving circuit He in accordance with the selection timing of the gate signal lines GL.

<<Constitution of Pixels>>

Figure 4:
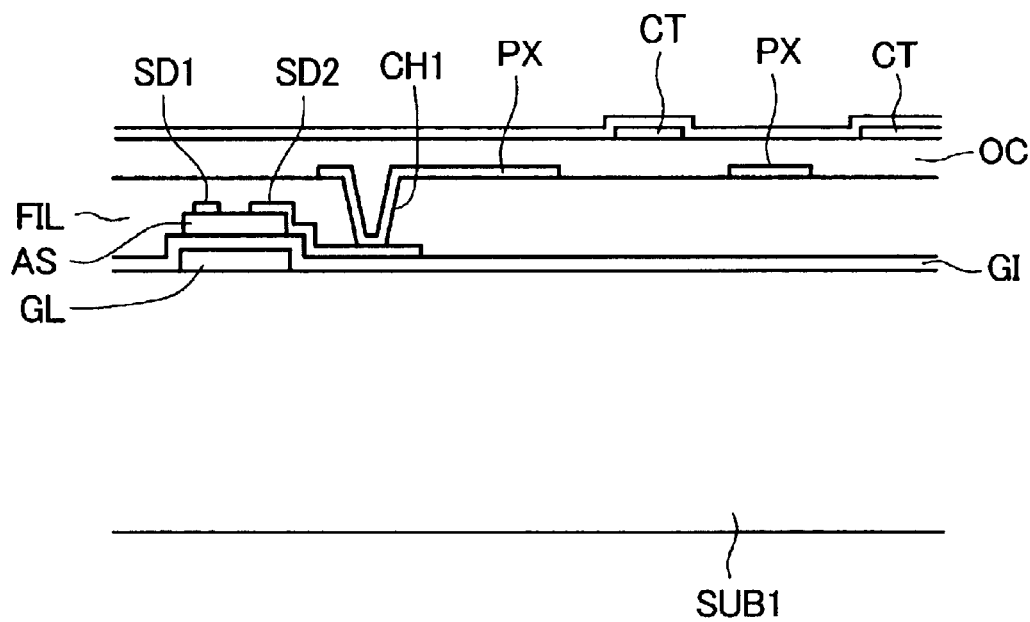
FIG. 4 is a cross-sectional view taken along a line IV—IV shown in FIG. 3.

FIG. 3 is a plan view showing the constitution of the pixel region and FIG. 4 is a cross-sectional view taken along a line IV—IV of FIG. 3.

On the liquid-crystal-side surface of the transparent substrate SUB1, first of all, a pair of gate signal lines GL (one gate signal line GL being not shown in the drawing) are formed such that the gate signal lines GL are extended in the x direction and are arranged in parallel in the y direction.

A pair of these gate signal lines GL surround the rectangular region together with a pair of drain signal lines DL (one drain signal line DL being not shown in the drawing) as explained later and this region constitutes the pixel region.

Further, the counter voltage signal line CL which is arranged in parallel with the gate signal lines GL is formed in the region defined between respective gate signal lines GL.

On the surface of the transparent substrate SUB1 on which the gate signal lines GL and the counter voltage signal lines CL are formed in the above-mentioned manner, an insulation film GI which is made of SiN, for example, is formed such that the insulation film GI also covers the gate signal lines GL and the counter voltage signal lines CL.

The insulation film GI performs a function of an interlayer insulation film with respect to the gate signal lines GL and the counter voltage signal lines CL in the region where the drain signal lines DL which will be explained later are formed, performs a function of a gate insulation film in a region where a thin film transistor TFT which will be explained later is formed, and performs a function of a dielectric film in a region where a capacitive element Cstg which will be explained later is formed.

Then, on a surface of the insulation film GI, a semiconductor layer AS which is made of amorphous Si, for example, is formed such that the semiconductor layer AS is superposed on a portion of the gate signal lines GL.

The semiconductor layer AS constitutes a portion of the thin film transistor TFT. That is, by forming a drain electrode SD1 and a source electrode SD2 on an upper surface of the semiconductor layer AS, an MIS type transistor having an inverse staggered structure which uses a portion of the gate signal line GL as a gate electrode can be formed.

Here, the drain electrode SD1 and source electrode SD2 are simultaneously formed along with the formation of the drain signal lines DL.

That is, the drain signal line DL which is extended in the y direction is formed and a portion of the drain signal line DL is extended to an upper surface of the semiconductor layer AS so as to form the drain electrode SD1, and the source electrode SD2 is formed in a spaced apart manner from the drain electrode SD1 by a length of channel of the thin film transistor TFT.

The source electrode SD2 is slightly extended from the surface of the semiconductor layer AS to an upper surface of the insulation film GI at the pixel region side thus forming a contact portion for providing the connection of the source electrode SD2 with the pixel electrode PX which will be explained later.

Further, on an interface between the semiconductor layer AS and the drain electrode SD1 and the source electrode SD2, a thin film doped with impurities of high concentration is formed and this layer functions as a contact layer.

The contact layer may be formed such that, at the time of forming the semiconductor layer AS, an impurity layer of high concentration is preliminarily formed, and using patterns of the drain electrode SD1 and the source electrode SD2 formed on an upper surface of the impurity layer as masks, the impurity layer which is exposed from the drain electrode SD1 and the source electrode SD2 are etched.

On a surface of the transparent substrate on which the thin film transistor TFT, the drain signal lines DL, the drain electrodes SD1 and the source electrodes SD2 are formed in the above-mentioned manner, a color filter FIL is formed.

The color filter FIL has a color which is different from a color of other neighboring pixel region in the x direction and is common with a color of other neighboring pixel region in the y direction.

That is, the color filters FIL of a group of pixel regions which are arranged in parallel in the y direction are formed of common resin material layers containing the same pigment and these color filters are separately formed from the color filters FIL formed of resin material layers which are formed in common with respect to other group of pixel regions which are arranged in parallel in the y direction at both sides of the above-mentioned group of pixel regions and contain the pigment of different color.

In this case, the color filter FIL also plays a role of a protective film which prevents the deterioration of characteristics of the thin film transistor TFT by avoiding the direct contact between the thin film transistor TFT and the liquid crystal.

The pixel electrode PX is formed on an upper surface of the color filter FIL. The pixel electrode PX is constituted of a group of electrodes formed of a plurality of (two pieces in this embodiment) which are extended in the y direction and are arranged in parallel in the x direction, for example. These respective electrodes are connected in common at portions which are disposed close to the thin film transistor TFT and are electrically connected with the contact portion of the source electrode SD2 of the thin film transistor TFT through a contact hole CH1 formed in the color filter FIL.

Then, on an upper surface of the color filter FIL on which the pixel electrode PX is formed in this manner, a flattening film OC which is made of a resin material layer, for example, is formed such that the flattening film OC also covers the pixel electrode PX.

Further, the counter electrode CT is formed on an upper surface of the flattening film OC. The counter electrode CT is constituted of a group of a plurality of electrodes (three pieces in this embodiment) which are extended in the y direction and are arranged in parallel in the x direction.

In a plan view, the respective counter electrodes CT are positioned such that the pixel electrode PX is arranged between the counter electrode CT. That is, these counter electrodes CT are respectively arranged at an equal interval in the order of the counter electrode CT, the pixel electrode PX, the counter electrode CT, the pixel electrode PX and the counter electrode CT from the drain signal line DL at one side to the drain signal line DL at the other side.

Further, the counter electrodes CT which are constituted of a group of electrodes in this manner are electrically connected with each other at portions thereof which are superposed on the counter voltage signal line CL and have portions thereof electrically connected with the counter voltage signal line CL through contact holes CH2 which are formed in the flattening film OC and the color filter FIL as through holes.

Here, among a group of respective counter electrodes CT, a pair of counter electrodes CT which are positioned at both sides, that is, the counter electrodes CT which are disposed adjacent to the drain signal lines DL are formed such that their width is slightly larger than the width of other counter electrodes CT.

Such a constitution is adopted for facilitating the line of electric force from the drain signal line DL to be terminated to the neighboring counter electrode CT as well as for preventing the lines of electric force from the drain signal line DL from getting over the counter electrode CT and being terminated to the pixel electrode PX. That is, when the lines of electric force are terminated to the pixel electrode PX, this gives rise to noises.

Further, portions of the respective counter electrodes CT which are electrically connected are superposed on portions of respective pixel electrodes PX which are electrically connected by way of the flattening film OC which constitutes a layer disposed below the respective counter electrodes CT. Further, portions of respective pixel electrodes PX which are electrically connected are superposed on the counter voltage signal line CL by way of the color filter FIL and the insulation film GI. Capacitive elements Cstg are formed at these respective superposed portions.

These capacitive elements Cstg have a function of storing video signals supplied to the pixel electrodes PX, for example, for a relatively long period.

On the upper surface of the transparent substrate SUB1 on which the counter electrodes CT are formed, an orientation film ORI1 is formed such that the orientation film ORI1 also covers the counter electrodes CT. The orientation film ORI1 is a film which directly comes into contact with the liquid crystal and is provided for determining the initial orientation direction of liquid crystal molecules by a rubbing formed on a surface thereof.

<<Relationship with other neighboring pixels>>

FIG. 1 is a view showing a cross section of respective pixel regions provided with the red color filter FIL (R), the green color filter FIL (G) and the blue color filter FIL (B) which are arranged close to each other. Although the pixel having two pixel electrodes PX and three counter electrodes CT is shown in FIG. 4, to simplify the explanation, the pixel having one pixel electrode PX and two counter electrodes CT is shown in FIG. 1.

In FIG. 1, first of all, the red color filter FIL (R), the green color filter FIL (G) and the blue color filter FIL (B) are formed with their layer thicknesses made different from each other. As mentioned previously, there may be a case that the layer thicknesses of respective color filters are intentionally set to different values to attain the balance of transmittance or color purity among respective color filters FIL or a case in which the layer thickness is not made uniform over all color filters FIL due to the irregularities in manufacturing these color filters FIL.

Accordingly, the difference in layer thicknesses of respective color filters FIL is reflected on the height of the flattening film OC formed on the respective color filters FIL from the surface of the transparent substrate SUB1. That is, the height of the flattening film OC is set high when the layer thickness of the color filter FIL is large and is set low when the layer thickness of the color filter FIL is small.

Although the flattening film OC is constituted of a resin film formed by coating in this embodiment, it is difficult to make the flattening film OC completely flat in a literal meaning of the word. For example, in reality, even when the complete flattening is requested, this leads to the cumbersomeness of the manufacturing process.

Accordingly, with respect to the pixel having the color filter FIL of large layer thickness, the layer thickness of the liquid crystal (liquid crystal gap) becomes small, while with respect to the pixel having the color filter FIL of small layer thickness, the layer thickness of the liquid crystal becomes large.

Here, the liquid crystal is interposed between the transparent substrate SUB1 and the transparent substrate SUB which is arranged to face the transparent substrate SUB1 in an opposed manner and at least the color filters FIL are not formed on the liquid-crystal-side surface of the transparent substrate SUB2.

In this manner, in the pixel region having the liquid crystal of small layer thickness, when it is necessary to make the liquid crystal obtain the fixed light transmittance in such a portion, a voltage applied between the pixel electrode PX and the counter electrode CT must be increased, while in the pixel region having liquid crystal of large layer thickness, the voltage which is applied between the pixel electrode PX and the counter electrode CT must be decreased.

In other words, when the voltage applied between the pixel electrode PX and the counter electrode CT is set uniform, the light transmittance of the liquid crystal fluctuates in response to the layer thickness of the color filter FIL.

To cope with such a drawback, in this embodiment, when the layer thickness of the color filters FIL is decreased in the descending order of the red color filter FIL (R), the green color filter FIL (G) and the blue color filter FIL (B), for example, the film thickness of the flattening film OC which is superposed on these respective color filters FIL are sequentially increased.

To explain in more detail, the film thickness of the flattening film OC is set to satisfy the following formula (1);

0< film thickness difference of interlayer insulation films between pixel regions<film thickness difference of color filters between pixel regions    (1) and the relationship that as the thickness of the color filter FIL corresponding to the pixel is increased, the film thickness of the flattening film OC corresponding to the pixel is increased.

When material having the same viscosity as that of the material of a conventional flattening film is used as the material of the flattening film OC, the coating is performed using spin coating. In this case, it is possible to set the film thickness to the above-mentioned relationship by controlling the rotational speed of the spin to a proper value. It is needless to say that a technique other than the spin coating can be used for forming the flattening film OC.

The liquid crystal display device having such a constitution can obviate the elevation of the driving voltage caused by the attenuation of the driving electric field due to the fact that the layer thickness of the flattening film OC is thick and also can obviate the lowering of the driving voltage caused by the birefringence mode derived from the fact that the layer thickness of the liquid crystal is thick.

Since these advantageous effects work in a complementary manner, the irregularities of the driving voltage for driving the liquid crystal can be suppressed.

Further, as another embodiment, the brightness irregularities can be further suppressed by making the liquid crystal display device satisfy a following formula (2).

¼×film thickness of color filter FIL between pixels<film thickness difference of flattening film OC between pixels, <¾×film thickness difference of color filter FIL between pixels    (2)

Further, in adopting the above-mentioned constitution, when the film thickness of the flattening film OC is excessively large, the surface becomes flattened and hence, it is preferable to make the liquid crystal device satisfy a following formula (3).

$$\text{film thickness of flattening film OC} < \tfrac{1}{2} \text{times film thickness of thickest color filter FIL} \quad (3)$$

Further, when the film thickness of the flattening film OC is excessively small, the stepped-portion narrowing effect is reduced and hence, it is preferable to make the liquid crystal display device satisfy a following formula (4).

$$\tfrac{1}{4}\text{times film thickness of thinnest color filter FIL} < \text{film thickness of flattening film OC} < \tfrac{1}{2} \text{ times film thickness of thickest color filter FIL} \quad (4)$$

Embodiment 2

Figure 5:
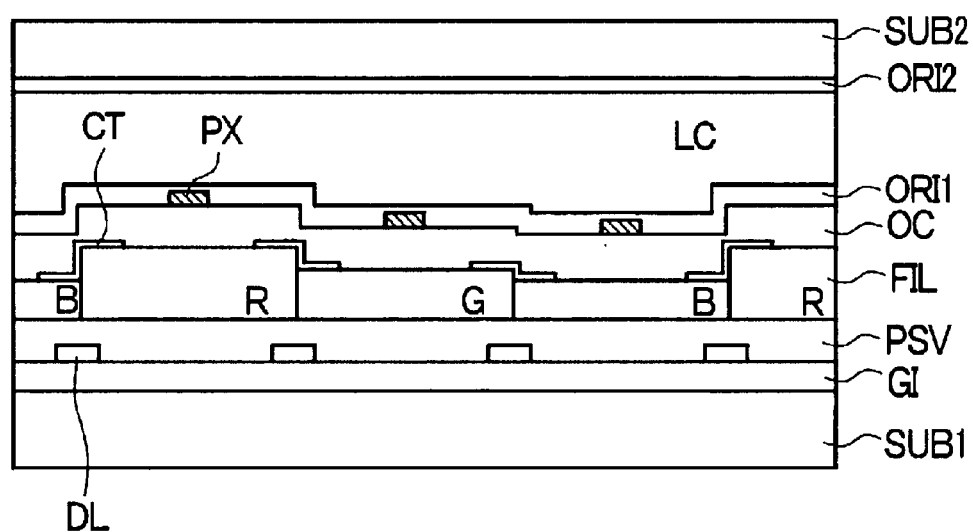
FIG. 5 is a cross-sectional view of another embodiment of the liquid crystal display device according to the present invention.

FIG. 5 is a cross-sectional view of another embodiment of a liquid crystal display device according to the present invention and corresponds to FIG. 1.

The constitution which differs from the constitution shown in FIG. 1 is that respective counter electrodes CT which are positioned at both sides of the drain signal line DL are connected such that the counter electrodes CT also cover the drain signal lines DL.

Due to such a constitution, lines of electric force from the drain signal lines DL which become a cause of noises are terminated to the corresponding counter electrodes CT and hence, it is possible to sufficiently prevent the lines of electric force from being terminated to the pixel electrodes PX arranged close to the counter electrodes CT.

Embodiment 3

Figure 6:
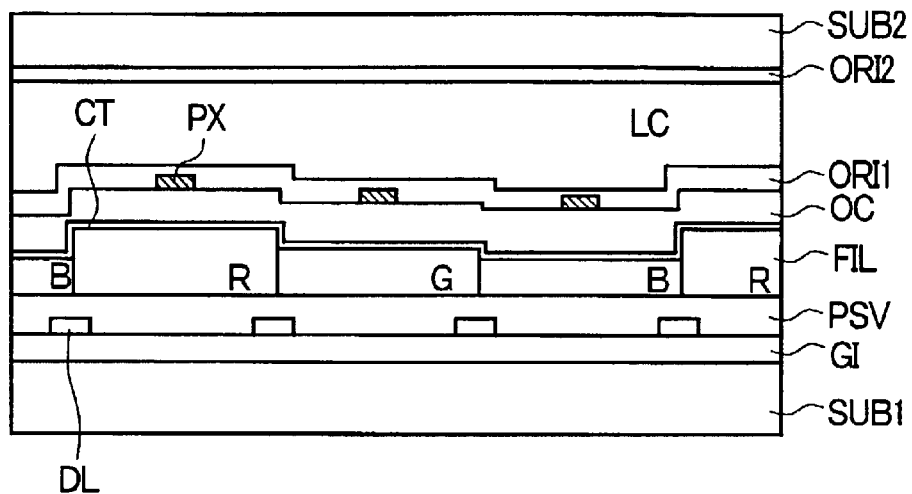
FIG. 6 is a cross-sectional view of another embodiment of the liquid crystal display device according to the present invention.

FIG. 6 is a cross-sectional view of another embodiment of a liquid crystal display device according to the present invention and corresponds to FIG. 1.

The constitution which differs from the constitution shown in FIG. 1 is that the counter electrodes CT are formed over the whole regions of respective pixel regions and are also connected with the neighboring counter electrodes CT each other.

Here, as material of the counter electrodes CT, transparent material such as ITO (Indium Tin Oxide), for example, is used.

Due to such a constitution, there is no fear of disconnection of the counter electrodes CT and the total resistance value can be drastically reduced.

Embodiment 4

Figure 7:
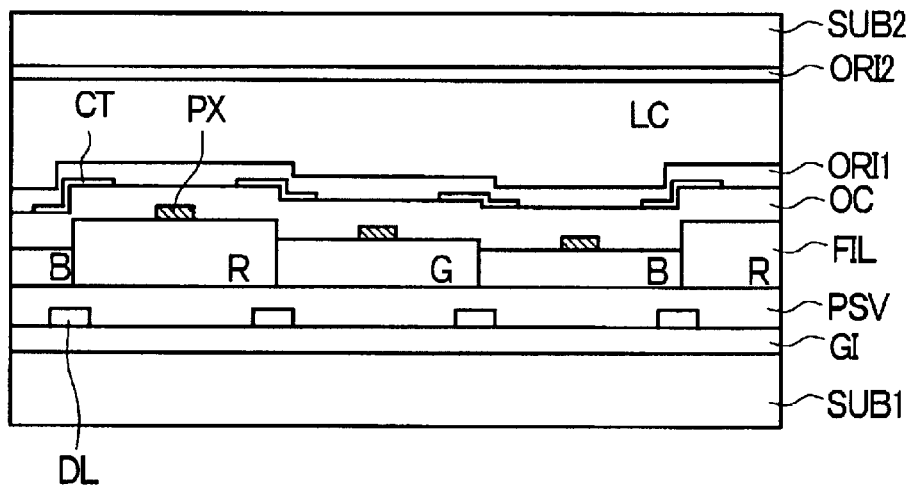
FIG. 7 is a cross-sectional view of another embodiment of the liquid crystal display device according to the present invention.

FIG. 7 is a cross-sectional view of another embodiment of a liquid crystal display device according to the present invention and corresponds to FIG. 5.

The constitution which differs from the constitution shown in FIG. 5 is that the pixel electrodes PX are formed as layers below the flattening film OC and the counter electrodes CT are formed as layers above the flattening film OC.

Also in this embodiment, respective counter electrodes CT which are positioned at both sides of the drain signal line DL are connected with each other such that the counter electrodes CT also cover the drain signal lines DL.

Since stepped portions formed by the flattening film OC are smaller than stepped portions formed by the color filters FIL, the counter electrodes CT formed on the stepped portions are formed on the flattening film OC.

Embodiment 5

Figure 8:
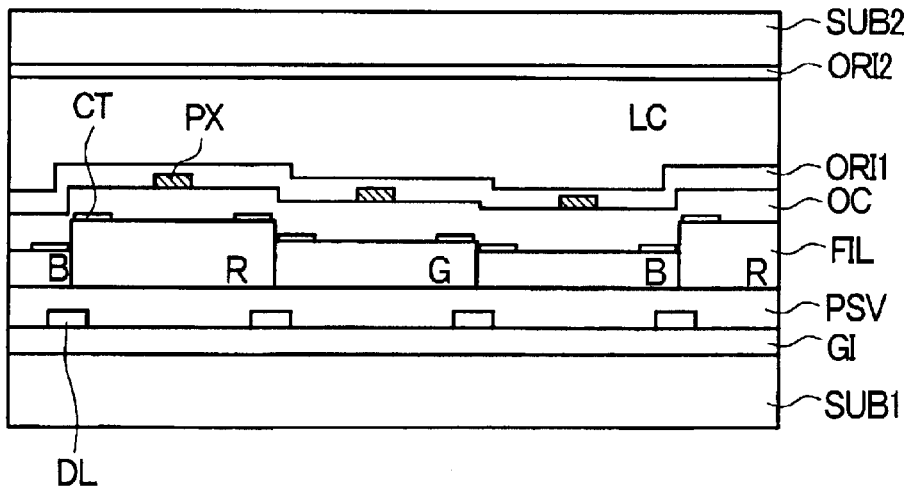
FIG. 8 is a cross-sectional view of another embodiment of the liquid crystal display device according to the present invention.

FIG. 8 is a cross-sectional view of another embodiment of a liquid crystal display device according to the present invention and corresponds to FIG. 1.

The constitution which differs from the constitution shown in FIG. 1 is that the pixel electrodes PX are formed as layers above the flattening film OC and the counter electrodes CT are formed as layers below the flattening film OC. That is, this embodiment is characterized by changing over the layers constituting respective electrodes.

Due to such a constitution, the same advantageous effects can be obtained.

Embodiment 6

Figure 9:
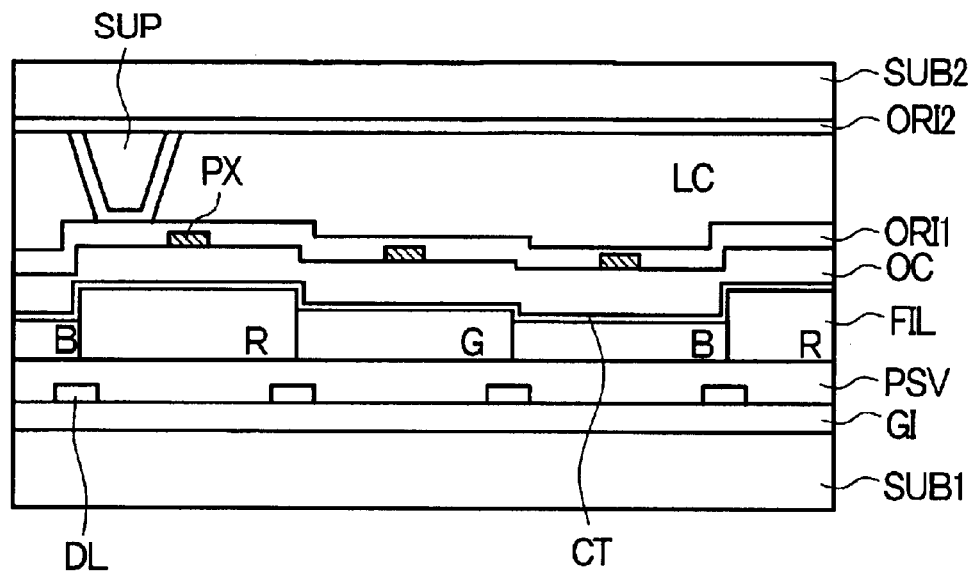
FIG. 9 is a cross-sectional view of another embodiment of the liquid crystal display device according to the present invention.

FIG. 9 is a cross-sectional view of another embodiment of a liquid crystal display device according to the present invention and corresponds to FIG. 6, for example.

The constitution which differs from the constitution shown in FIG. 6 is that spacers which define a gap between the transparent substrate SUB1 and the transparent substrate SUB are constituted of so-called support columns SUP which are formed on the liquid-crystal-side surface of the transparent substrate SUB by selectively etching resin material using a photolithography technique, for example.

To apply the present invention to the liquid crystal display device, it is necessary to accurately determine the layer thickness of the liquid crystal. The irregularities of height of the liquid crystal can be minimized with the provision of the stoppers which are constituted of the support columns SUP.

As locations where these spacers are formed, the spacers are positioned such that distal ends thereof are brought into contact with the color filters FIL having the largest film thickness. The film thickness of the flattening film OC formed on the color filters FIL having the largest film thickness is small and hence, the irregularities of the film thickness is small whereby the uniformity of the gap formed by the spacers can be ensured.

Although the irregularities of the height is increased when the height of the spacers per se is increased, by bringing the spacers into contact with the color filters FIL having the largest film thickness, the height of the spacers can be made small so that the irregularities of the height are reduced whereby the uniformity of the gap formed by the spacers can be ensured.

Embodiment 7

Figure 10:
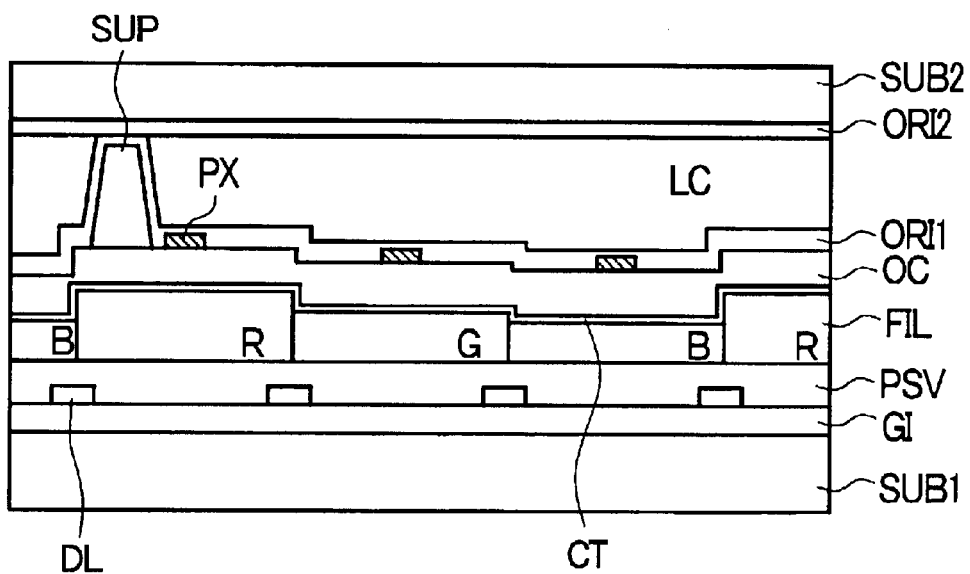
FIG. 10 is a cross-sectional view of another embodiment of the liquid crystal display device according to the present invention.

FIG. 10 is a cross-sectional view of another embodiment of a liquid crystal display device according to the present invention and corresponds to FIG. 9.

The constitution which differs from the constitution shown in FIG. 9 is that the spacers constituted of the support columns SUP are formed on the liquid-crystal-side surface of the transparent substrate SUB1.

Embodiment 8

Figure 11:
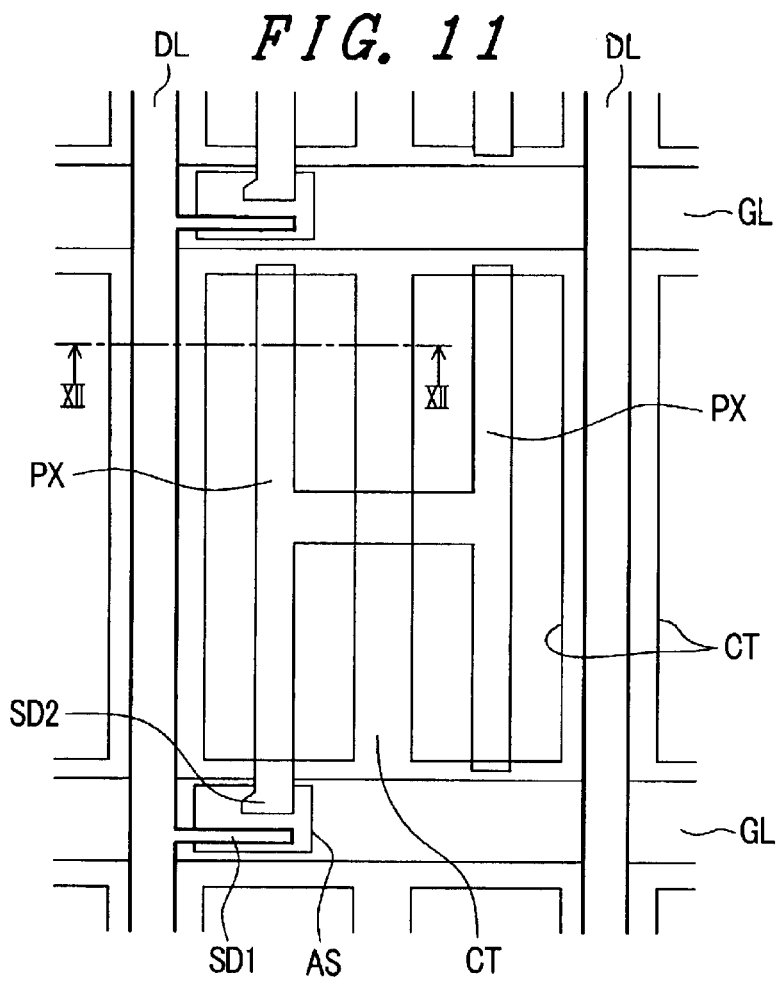
FIG. 11 is a plan view of another embodiment of the pixel of the liquid crystal display device according to the present invention.
Figure 12:
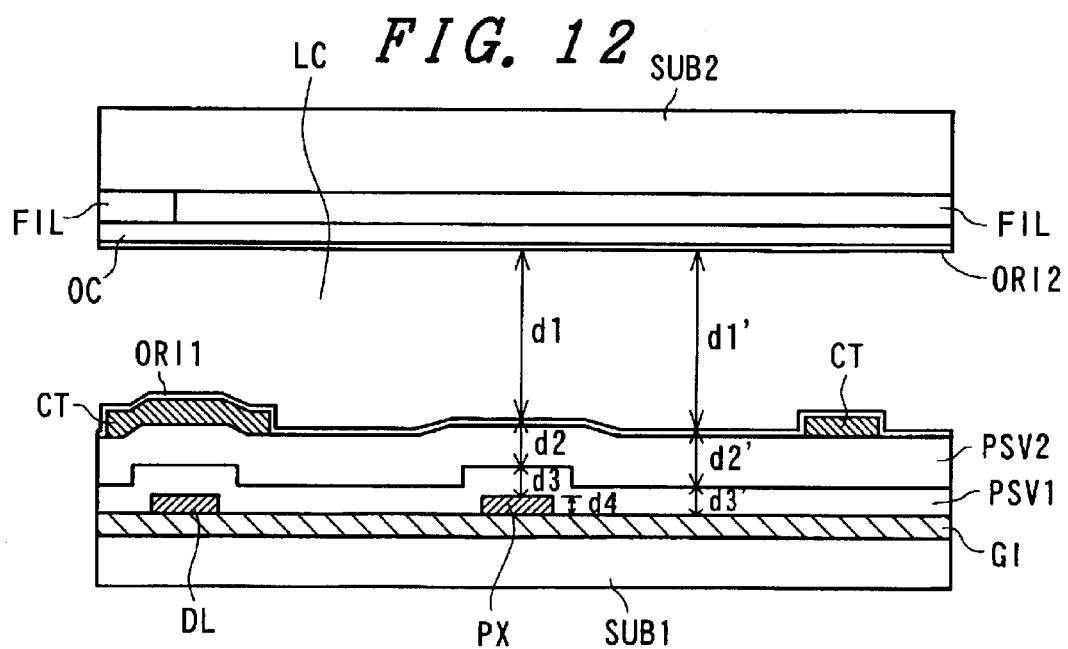
FIG. 12 is a cross-sectional view taken along a line XII—XII shown in FIG. 11.

FIG. 11 is a plan view showing another embodiment of the pixel of the liquid crystal display device according to the present invention and FIG. 12 is a cross-sectional view taken along a line XII—XII in FIG. 11.

Different from the liquid crystal display devices of the above-mentioned embodiments, in the liquid crystal display device shown in FIG. 11, the color filters FIL are formed on the transparent substrate SUB side and the flattening film OC is formed such that the flattening film OC also covers the color filters FIL.

At respective pixel regions on the liquid-crystal-LC-side surface of the transparent substrate SUB1, the pixel electrodes PX are formed on the gate insulation films GI, and the counter electrodes CT are formed on an upper surface of a laminated body which covers the pixel electrodes and consists of a protective film PSV1 made of SiN film and a protective film PSV2 made of organic material, for example.

Further, with respect to the counter electrode CT which is arranged close to the drain signal line DL out of these counter electrodes CT, such a counter electrode CT is formed such that the counter electrode CT covers the drain signal line DL and is connected to the other counter electrode CT which is arranged close to the drain signal line DL in other neighboring pixel region which is disposed close to the pixel region of the counter electrode CT while sandwiching the drain signal line DL between the pixel region and the other neighboring pixel region.

Then, assuming the film thicknesses of respective protective films PSV1, PSV2 on the pixel electrode PX as $d_3$, $d_2$ and the film thicknesses of respective protective films PSV1, PSV2 on a region between the counter electrode CT and the pixel electrode PX as $d_3'$, $d_2'$, when the relationship among these layer thicknesses satisfies a following formula (5), the influence of the film thickness $d_4$ of the pixel electrodes PX can be attenuated.

$$d_3 \equiv d_3', \quad d_2 < d_2' < d_2 + d_4 \qquad (5)$$

Accordingly, the relationship between the layer thickness (liquid crystal gap) $d_1$ of the liquid crystal on the pixel electrode PX and the liquid crystal gap $d_1'$ on the region between the counter electrode CT and the pixel electrode PX can be expressed by a following formula (6).

$$d_1 \equiv d_1' \text{ (here, } d_1 \leq d_1') \qquad (6)$$

The reason that the condition $d_1 \leq d_1'$ is set is that it is difficult to manufacture the liquid crystal display device under the condition of $d_1 > d_1'$ in actual manufacturing.

Due to such a constitution, the concentration of the electric field due to the liquid crystal gap in respective pixels can be attenuated.

It is preferable that the approximation in the formulae (5), (6) is equal to or less than 100 nm.

Further, the electric field which is generated between the counter electrode CT and the pixel electrode PX is weakened by the protective films PSV1, PSV2 interposed between respective electrodes.

Due to the relationship expressed by the above-mentioned formula (5), the electric field applied to the protective films PSV1, PSV2 on the pixel electrode PX becomes smaller than the electric field applied to the protective films PSV1, PSV2 in the region between the counter electrode CT and the pixel electrode PX so that the electric field is liable to be applied to the liquid crystal at the gap $d_1$ portion.

Figure 13A:
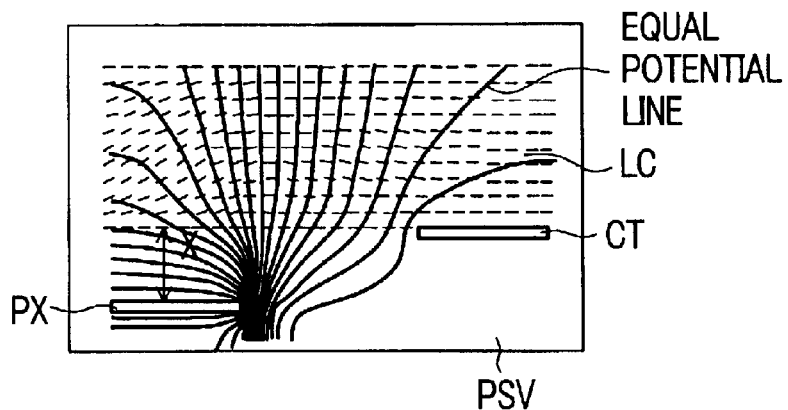
FIG. 13 is an explanatory view for explaining an advantageous effect according to the present invention.
Figure 13B:
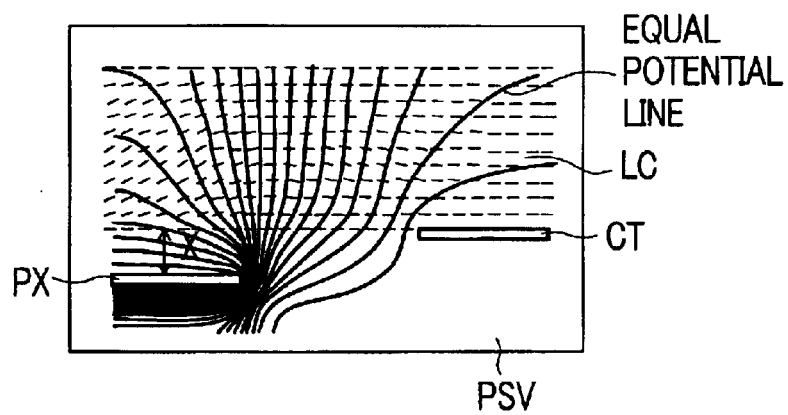
Figure 13C:
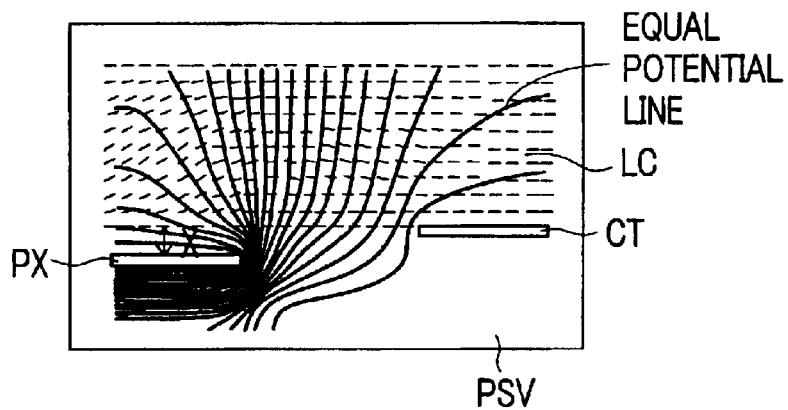

FIGS. 13(*a*), (*b*), (*c*) are views for showing the thickness x of the protective film on the pixel electrode PX and the change of electric field in the liquid crystal corresponding to the thickness x. As can be clearly understood from these drawings, corresponding to the decrease of the thickness x of the protective film, the electric field on the pixel electrode PX is increased.

Accordingly, in this method which adopts the lateral electric field driving, it is possible to form the uniform electric field between the counter electrode CT and the pixel electrode PX in each pixel region.

To explain the conventional constitution, the layer thickness of the protective films are set such that $d_3 \equiv d_3'$, $d_2 \equiv d_2'$ and the electric field receives the influence of the film thickness $d_4$ of the pixel electrode PX so that the relationship between the liquid crystal gap $d_1$ on the pixel electrode PX and the liquid crystal gap $d_1'$ on the region between the counter electrode CT and the pixel electrode PX is expressed as $d_1 + d_4 \equiv d_1'$.

In the liquid crystal of the birefringence mode used in the lateral electric field driving, the wider the liquid crystal gap, the voltage for driving the liquid crystal is lowered. Accordingly, the liquid crystal at the liquid crystal gap $d_1'$ portion can be driven easily at the low voltage compared to the liquid crystal at the liquid crystal gap $d_1$ portion.

Further, the shortest length $X_1$ between the counter electrode CT which passes along the surface of the protective film PSV2 and the pixel electrode PX at the liquid crystal gap $d_1$ portion is longer than the shortest length $X_1'$ between the counter electrode CT which passes along the surface of the protective film PSV2 and the pixel electrode PX at the liquid crystal gap $d_1'$ portion and the above-mentioned relationship $d_3 \equiv d_3'$, $d_2 \equiv d_2'$ is established. Accordingly, based on an formula E=A×V/x (E: electric field, V: voltage applied to counter electrode and pixel electrode, x: shortest length between counter electrode which passes along surface of protective film PSV2 and pixel electrode, A: positive proportion constant), the electric field applied to the liquid crystal gap $d_1'$ portion is remarkably increased compared to the electric field applied to the liquid crystal gap $d_1$ portion so that the electric field of the pixel region in the vicinity of the pixel electrode PX becomes weak thus giving rise to the lowering of the light transmittance.

Embodiment 9

Figure 14:
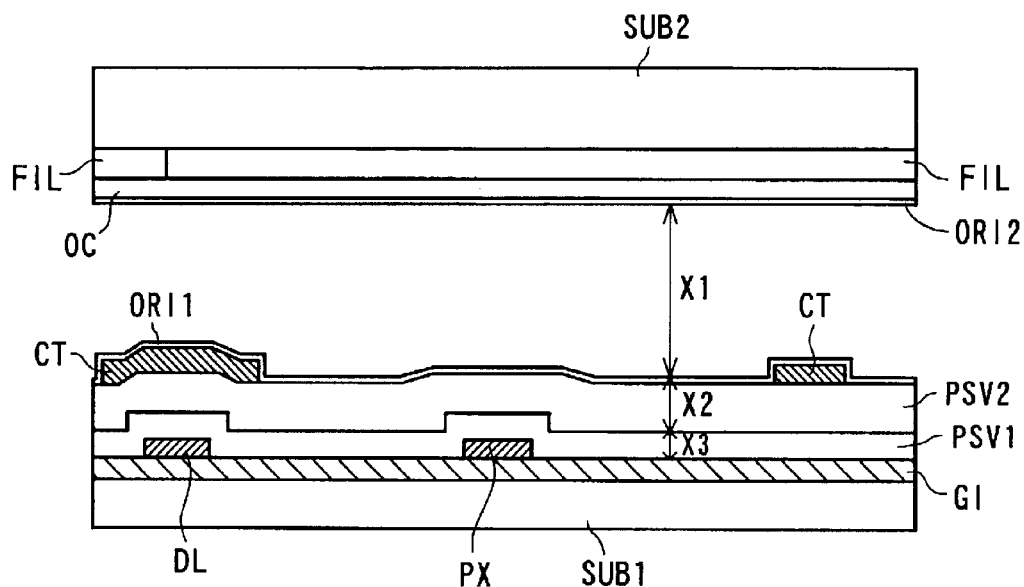
FIG. 14 is a cross-sectional view showing another embodiment of the liquid crystal display device according to the present invention.
Figure 15:
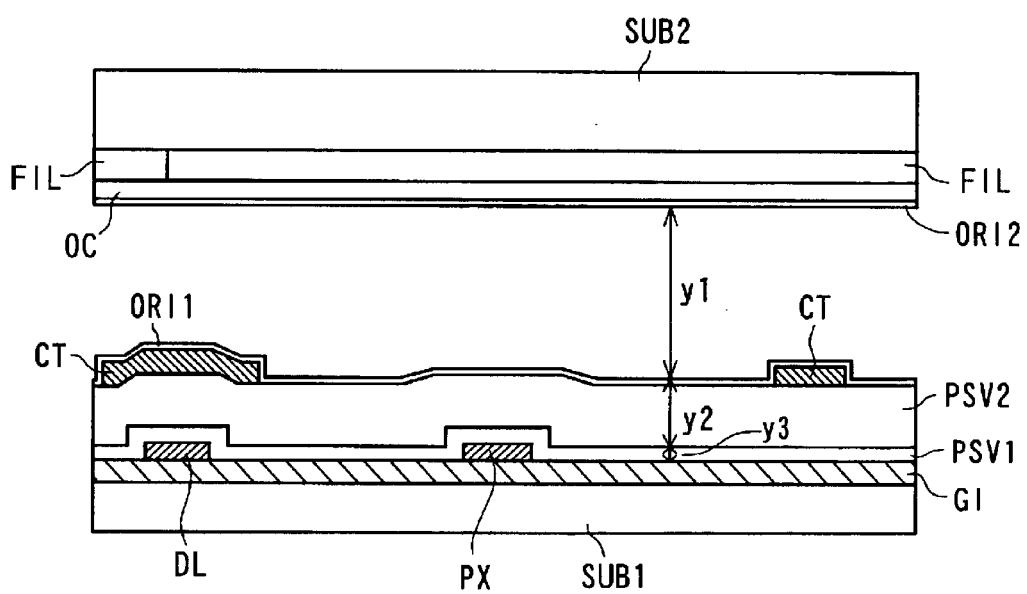
FIG. 15 is a cross-sectional view showing another embodiment of the liquid crystal display device according to the present invention.
Figure 16:
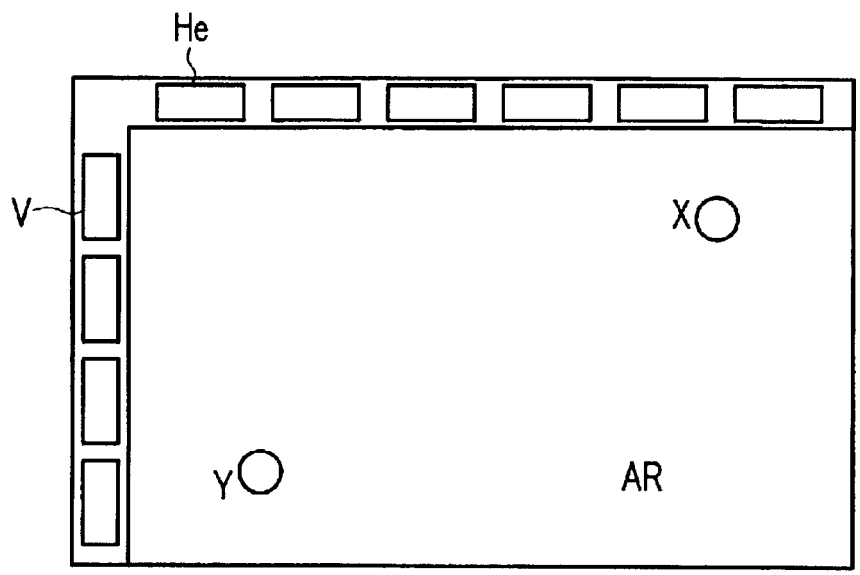
FIG. 16 is an explanatory view necessary for showing portions of respective pixels shown in FIG. 14 and FIG. 15.

FIG. 14 is a cross-sectional view of the pixel at a portion of a liquid crystal display device according to the present invention and FIG. 15 is a cross-sectional view of the pixel at another portion of the liquid crystal display device. For example, in a liquid crystal display part AR of the liquid crystal display device shown in FIG. 16, a cross section of the pixel at the portion X in the drawing is shown in FIG. 14 and a cross section of the pixel at the portion Y in the drawing is shown in FIG. 15. Here, the cross-sectional portion of the pixel is similar to that of FIG. 11.

To compare the constitutions described in FIG. 14 and FIG. 15, they differ in the film thickness of the protective film PSV1 at the portion of the liquid crystal display part AR. That is, while the film thickness of the protective film PSV1 in FIG. 14 is set to $X_3$, the film thickness of the protective film PSV1 in FIG. 15 is set to $y_3$ ($<x_3$).

In forming the protective film PSV1, the protective film PSV1 is not formed uniformly over the entire region of the liquid crystal display part AR and this implies that there exists the irregularities of film thickness.

Here, while the film thickness of the protective film PSV2 formed on the upper surface of the protective film PSV1 is set to $x_2$ in FIG. 14, the film thickness of the protective film PSV2 is set to $Y_2$ ($\equiv x_2$) in FIG. 15. That is, these film thicknesses are assumed to be substantially equal.

Here, the electric field applied to the region between the counter electrode CT and the pixel electrode PX is increased at the thin portion of the protective film PSV1 since the liquid crystal gaps $x_1$, $y_1$ have the relationship of $x_1 \equiv y_1$ (substantially equal to the diameter of beads contained in the liquid crystal).

Accordingly, in this embodiment, to make the electric field uniform over the respective pixel regions, the film thicknessses of the protective film PSV2 are set to $x_2 < Y_2$. This setting is made to compensate for the relationship $X_3 > y_3$ of respective film thicknesses of the protective film PSV1.

In view of the above, a following formula (7) is established.

$$x_2 + x_3 \equiv y_2 + y_3, \quad x_3 > y_3, \quad x_2 < y_2 \qquad (7)$$

In the above-mentioned respective embodiments, the pixel electrodes PX are formed as layers below the protective film PSV and the counter electrodes CT are formed as layers above the protective film PSV. However, it is needless to say that the pixel electrodes PX and the counter electrodes CT may be formed in a reverse manner. That is, the pixel electrodes PX are formed as layers above the protective film and the counter electrodes CT are formed as layers below the protective film PSV.

Embodiment 10

Figure 17:
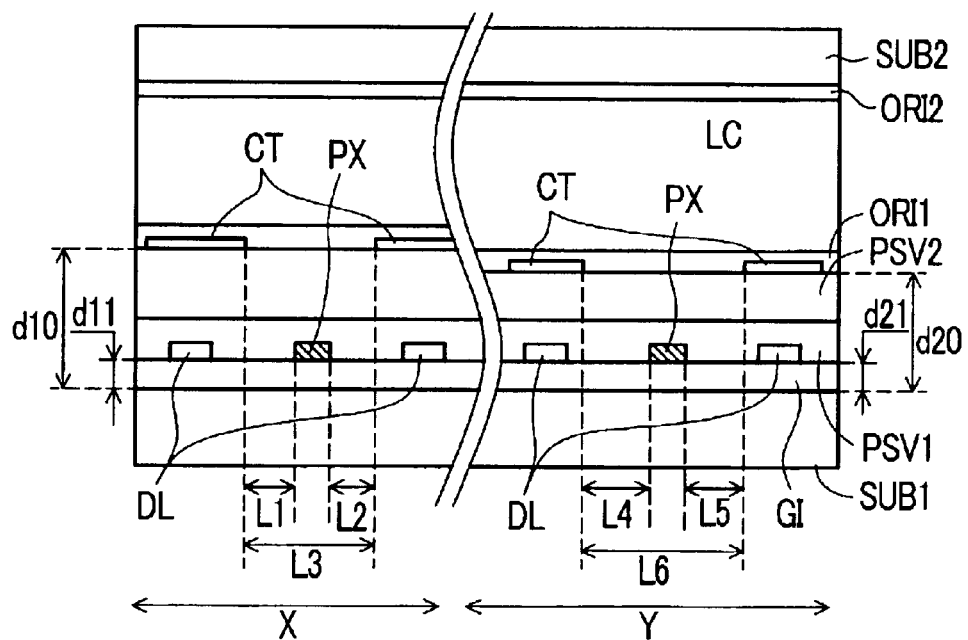
FIG. 17 is a cross-sectional view showing another embodiment of the liquid crystal display device according to the present invention.
Figure 22:
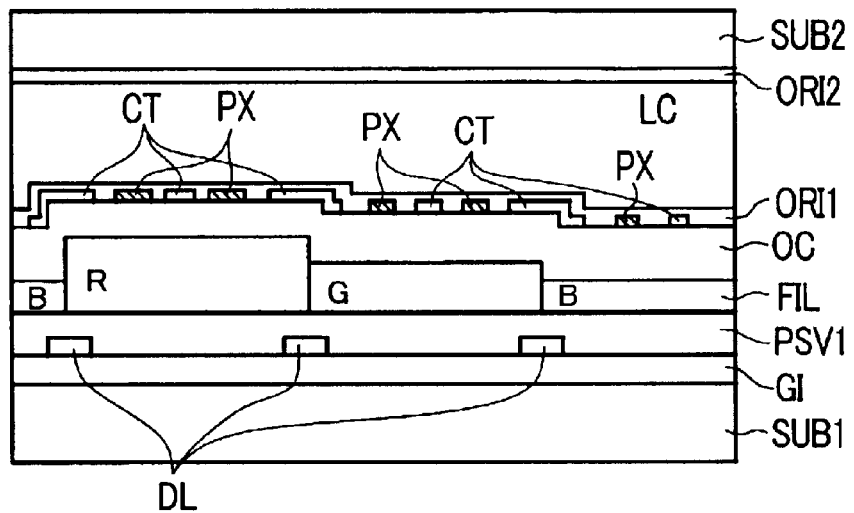
FIG. 22 is a cross-sectional view showing another embodiment of the liquid crystal display device according to the present invention.
Figure 23:
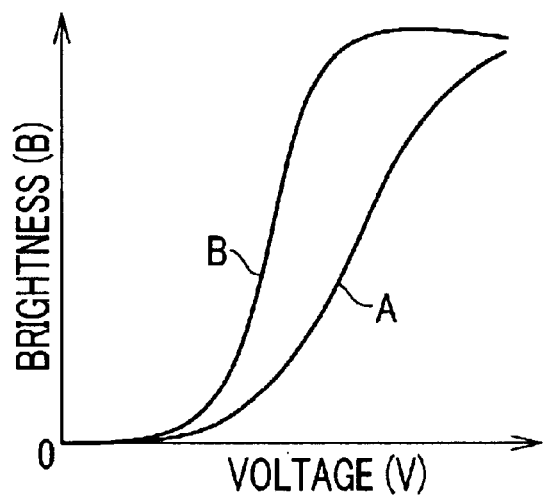
FIG. 23 is an explanatory view showing the displacement of a B-V curve.

When the distance from the substrate SUB1 to the liquid crystal layer differs, the thickness of the liquid crystal layer differs as shown in FIG. 17 as an example. In the lateral electric field, the driving voltage depends on the thickness of the liquid crystal layer. That is, the thicker the liquid crystal layer, the same brightness can be obtained with the lower voltage. Assuming that the distance between the electrodes is all equal in FIG. 17, the pixel in the region X assumes the higher driving voltage than the pixel in the region Y. This phenomenon is explained in conjunction with FIG. 22. In FIG. 22, the B-V curves are shown, wherein the voltage V is taken on the axis of abscissas and the brightness B is taken on an axis of ordinates. A indicates the B-V curve in the region X in FIG. 17 and B indicates the B-V curve in the region Y in FIG. 17. The curve A takes the gentler B-V curve than the curve B. Accordingly, these curves A, B differ in the gray scale displayed with respect to a certain voltage.

Accordingly, in this embodiment, as shown in FIG. 17, the distance between the electrodes is configured to have the particular constitution. The distance from the substrate SUB1 to the counter electrode CT at the pixel corresponding to the region X is longer than such a distance at the pixel corresponding to the region Y. In FIG. 17, the distance from the substrate SUB1 to the counter electrode CT assumes the relationship d10 >d20. Although a plurality of counter electrodes CT may be provided for each pixel, in FIG. 17, two counter electrodes CT are provided for each pixel. Assuming the distance between the counter electrodes CT at the pixel corresponding to the region X as L3 and such a distance at the pixel corresponding to the region Y as L6, the relationship L6>L3 is satisfied. That is, this embodiment is characterized in that the distance between the counter electrodes CT at the pixel corresponding to the region X is shorter than the distance between the counter electrodes CT at the pixel corresponding to the region Y.

Due to such a constitution, it is possible to make the intensities of electric field which are respectively formed in the region X and the region Y when the equal voltage is applied to become more uniform so that it is possible to make the inclinations of the B-V curves of both regions close to each other. Accordingly, the displacement of the gray scale can be reduced.

Further, assume the distance between the pixel electrode PX and the counter electrode CT at the pixel corresponding to the region X as L1 and L2 and the distance between the pixel electrode PX and the counter electrode CT at the pixel corresponding to the region Y as L4 and L5. Here, by making these distances satisfy the relationship L4, L6>L1, L2 or at least one of the relationships L4>L1 or L4>L2 and L5>L1 or L5>L2, it is possible to make the intensities of electric field respectively generated in the region X and the region Y when the equal voltages applied to become more uniform so that the inclinations of the B-V curves of both regions can be made closer to each other. Accordingly, the displacement of the gray scale can be reduced.

In FIG. 17, as an example, the protective film PSV1 is made of an inorganic film and the protective film PSV2 is made of an organic film, for example. In FIG. 17, the counter electrodes CT are arranged over the video signal lines DL by way of the organic films PSV2. Accordingly, while suppressing the parasitic capacitance between the video signal lines DL and the counter electrodes CT, it is possible to shield the electric field leaked from the video signal lines DL. To sufficiently obtain only the leaked electric field shielding effect by lowering the parasitic capacitance, it is preferable that the protective film PSV2 has some thickness. From this point of view, it is preferable that the protective film PSV2 is made of the organic film. However, the organic film has a serious drawback that the film thickness irregularities intrinsic to a coating device is liable to be generated. However, by adopting the concept of this embodiment, the influence of the difference of the film thickness to the B-V curves can be obviated so that it is possible to sufficiently obtain only the leaked electric field shielding effect.

Embodiment 11

Figure 18:
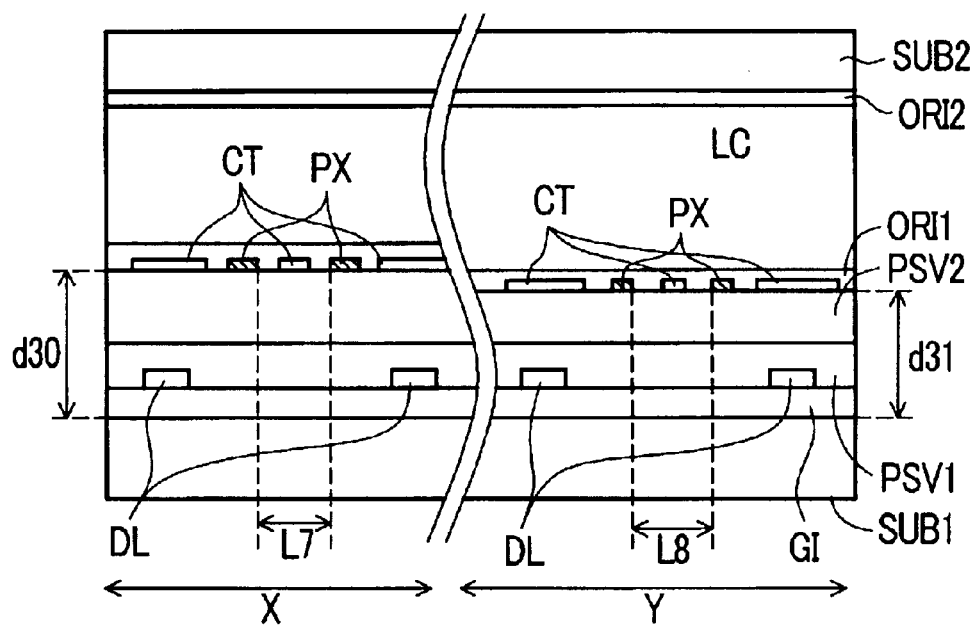
FIG. 18 is a cross-sectional view showing another embodiment of the liquid crystal display device according to the present invention.

FIG. 18 shows another constitutional example which can realize the improvement effect obtained by the embodiment 10. This embodiment differs from the embodiment 10 with respect to a point that the number of counter electrodes CT and the number of pixel electrodes PX are increased as shown in FIG. 17. This embodiment also differs from the embodiment 10 with respect to a point that both of the counter electrodes CT and the pixel electrodes PX are formed over the protective film PSV2. Constitutions other than the above-mentioned constitutions are as same as the corresponding constitutions in FIG. 17 and bring about the similar advantageous effect as the advantageous effects obtained by the corresponding constitutions in FIG. 17.

The distances from the substrate SUB1 to the pixel electrodes PX are set to d30>d31, wherein the distance at the region X is made larger than the distance at the region Y. Here, the distance between the pixel electrodes PX is set to satisfy the relationship L8>L7 wherein L7 indicates the distance at the region X and L8 indicates the distance at the region Y. Accordingly, due to such a constitution, in the same manner as the embodiment 10, it is possible to make the intensities of electric field which are respectively formed in the region X and the region Y when the equal voltage is applied to become more uniform so that the inclinations of the B-V curves of both regions can be made closer to each other. Accordingly, the displacement of the gray scale can be reduced.

Embodiment 12

The reduction of the displacement of the gray scale which has been explained in conjunction with the embodiment 10 is also effective with respect to the constitution which provides the difference in the thickness of the liquid crystal layer between the neighboring pixels.

Figure 19:
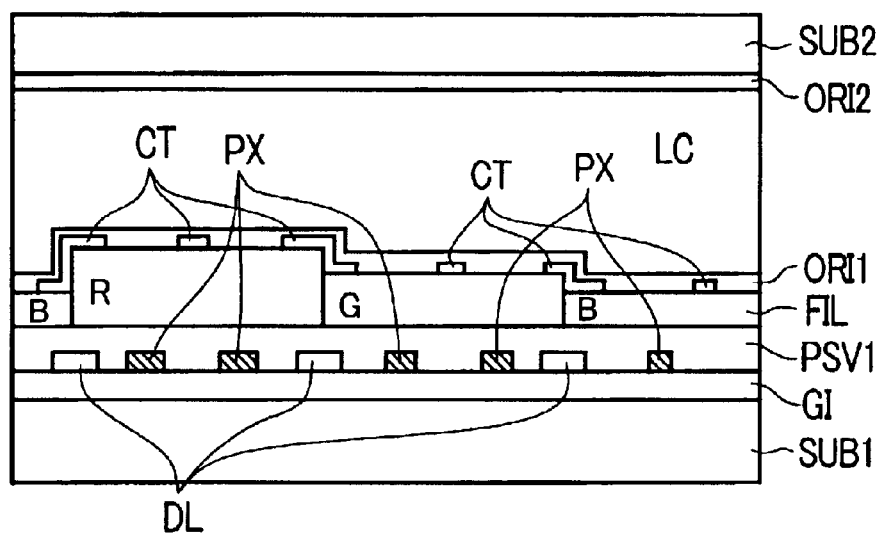
FIG. 19 is a cross-sectional view showing another embodiment of the liquid crystal display device according to the present invention.

FIG. 19 shows the constitution in which the thickness of the liquid crystal layer differs between the neighboring pixels. As the protective film PSV2 shown in FIG. 17, color filters FIL are provided. FIG. 19 shows the cross-sectional structure of a plurality of pixels in the direction that the gate signal lines GL are extended. In the drawing, the color of the color filter FIL assumes any one of values R, G, B for every pixel thus constituting the three primary colors. The boundaries of the color filters are positioned on the drain lines DL. In the liquid crystal display device, it is necessary to realize the given color. Accordingly, it is difficult to make the color filters have the completely equal thickness among colors. Accordingly, as shown in FIG. 19, the liquid crystal display device is configured such that the distance from the substrate SUB1 to the liquid crystal layer differs every pixel corresponding to the color filter FIL so that the thickness of the liquid crystal layer also differs every pixel.

To reduce the displacement of the gray scale using such a structure, it is advantageous to adopt at least one of following means.

(1) With respect to respective pixels, the longer the distance from the surface of the substrate SUB1 to the counter electrode CT, the distance between the counter electrodes CT is made shorter.

(2) With respect to respective pixels, the longer the distance from the surface of the substrate SUB1 to the counter electrode CT, distance between the counter electrode CT and the pixel electrode PX is made shorter.

This embodiment can reduce the displacement of the gray scale by adopting both of the above-mentioned means (1), (2).

The order of the film thickness of R, G, B in this embodiment is set for an explanation purpose and it is not always necessary to adopt this order. That is, the order can be suitably determined in conformity with the characteristics of materials of respective colors used for forming the color filters FIL. The essential point is that at least one of the above-mentioned means (1) or (2) is satisfied.

Embodiment 13

Figure 20:
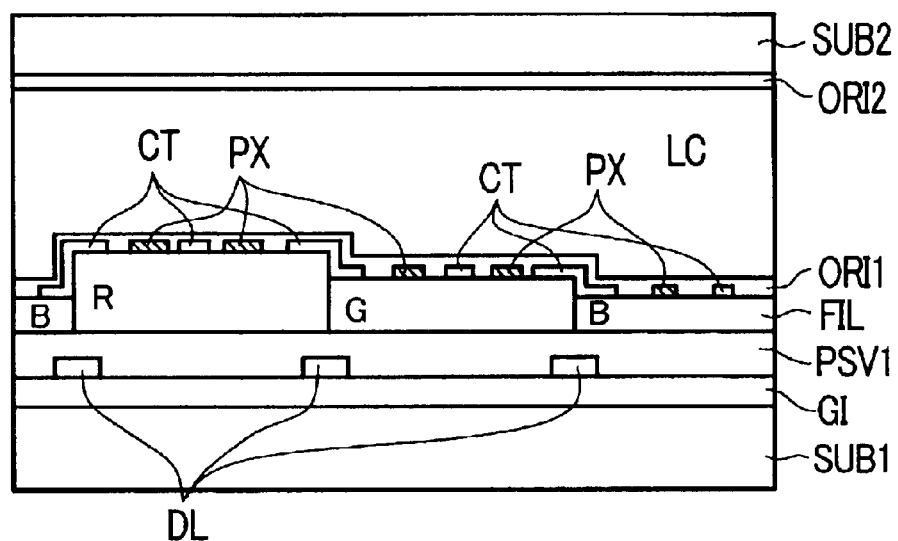
FIG. 20 is a cross-sectional view showing another embodiment of the liquid crystal display device according to the present invention.

FIG. 20 is a constitutional example in which the counter electrodes CT and the pixel electrodes PX in FIG. 19 are arranged over the color filters FIL. This constitution can also realize the reduction of the displacement of the gray scale by adopting at least one of the means (1), (2) of the embodiment 12. In this embodiment, both means (1) (2) are adopted thus enhancing the reduction of the displacement of the gray scale.

Embodiment 14

Figure 21:
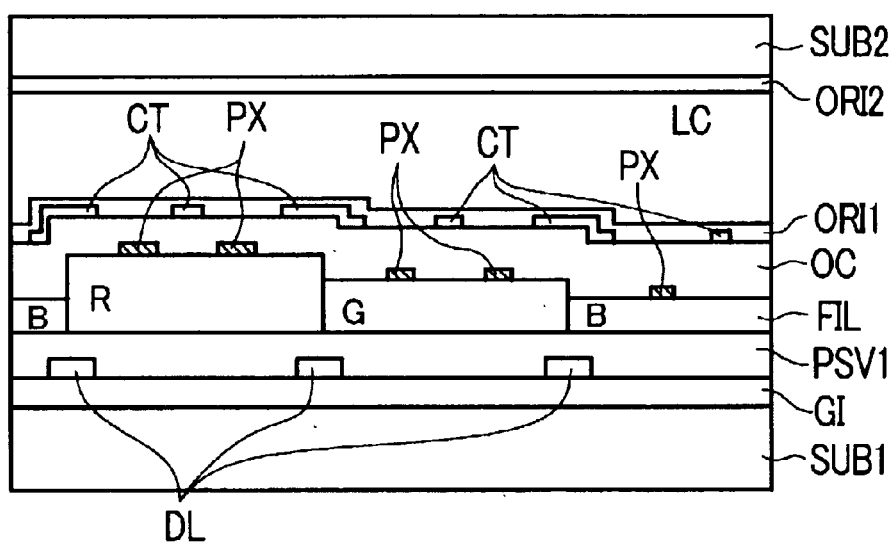
FIG. 21 is a cross-sectional view showing another embodiment of the liquid crystal display device according to the present invention.

FIG. 21 shows a schematic cross-sectional structure of a plurality of neighboring pixels in this embodiment. The difference between the structure shown in FIG. 21 and the structure shown in FIG. 19 lies in that an overcoat OC is formed over the color filters FIL. Difference also lies in that the counter electrodes CT are formed over the overcoat OC and the pixel electrodes PX are arranged below the overcoat OC.

The constitution of this embodiment also can realize the reduction of the displacement of the gray scale by adopting at least one of means (1), (2) of the embodiment 12.

Further, this embodiment is also characterized by the relationship of the film thickness of the overcoat OC with respect to the color filters FIL. That is, the overcoat OC is thin at the pixel having the thick color filter FIL and the overcoat OC is thick at the pixel having the thin color filter FIL. Due to such a constitution, the difference of thickness of liquid crystal layer among pixels having different colors can be reduced more compared to the state in which the overcoat OC is not provided. Due to such a constitution, the displacement of the gray scale can be reduced.

The overcoat OC having the relationship shown in FIG. 21 as an example can be realized by coating overcoat material in a liquid form whose viscosity is suitably determined on the color filters FIL, then leaving the overcoat material for several tens of seconds and, thereafter, heating the overcoat material OC together with the substrate SUB1.

In this embodiment, by adopting the structural feature which can reduce the difference of thickness of the liquid crystal layer and both of means (1), (2) of the embodiment 12, the displacement of the gray scale can be further reduced.

Embodiment 15

FIG. 22 corresponds to FIG. 21. The constitution shown in FIG. 22 differs from the constitution shown in FIG. 21 with respect to a point that the pixel electrodes PX are also formed over the overcoat OC.

The constitution of this embodiment also can reduce the displacement of the gray scale by adopting at least one of means (1), (2) of the embodiment 12.

The above-mentioned respective embodiments may be used in a single form or in combination. This is because that the advantageous effects of respective embodiments can be obtained in a single form or in combination.

As can be clearly understood from the above description, the liquid crystal display device according to the present invention can enhance the display quality.

What is claimed is:

1. A liquid crystal display device comprising:
   a pair of electrodes which constitute an upper layer and a lower layer with respect to an interlayer insulation film are formed as different layers at respective pixel regions on a liquid-crystal-side surface of one substrate out of respective substrates which are arranged to face each other in an opposed manner by way of liquid crystal,
   at the respective pixel regions, the heights of background layers on which the electrodes which constitute the lower layers with respect to the interlayer insulation film are formed differ with respect to a surface of one substrate, and
   the film thickness of the interlayer insulation film is set small with respect to the high background layer out of the respective background layers which differ in height and is set large with respect to the low background layer out of the respective background layers which differ in height.

2. A liquid crystal display device comprising:
   a pair of electrodes which constitute an upper layer and a lower layer with respect to an interlayer insulation film are formed as different layers at respective pixel regions on a liquid-crystal-side surface of one substrate out of respective substrates which are arranged to face each other in an opposed manner by way of liquid crystal,
   at two pixel regions which are selected from the respective pixel regions, the heights of background layers on which the electrodes which constitute the lower layers with respect to the interlayer insulation films differ with respect to a surface of one substrate, and
   the film thickness of the interlayer insulation film is set small with respect to the high background layer out of the respective background layers which differ in height and is set large with respect to the low background layer out of the respective background layers which differ in height.

3. A liquid crystal display device comprising:
   a pair of electrodes which constitute an upper layer and a lower layer with respect to an interlayer insulation film are formed on at least color filters as different layers at respective pixel regions on a liquid-crystal-side surface of one substrate out of respective substrates which are arranged to face each other in an opposed manner by way of liquid crystal from the one substrate side,
   at two pixel regions which are selected from the respective pixel regions and on which two color filters of different colors are formed, the heights of surfaces of the color filters differ with respect to a surface of one substrate, and
   the film thickness of the interlayer insulation film is set to satisfy a following formula 0<film thickness difference of the interlayer insulation film between pixel regions<film thickness difference of the color filters between pixel regions.

4. A liquid crystal display device according to claim 3, wherein the film thickness of the interlayer insulation film is smaller than ½ times a film thickness of a thickest color filter.

5. A liquid crystal display device according to claim 3, wherein the film thickness of the interlayer insulation film satisfies ¼ of film thickness of thinnest color filter<film thickness of interlayer insulation film<³⁄₂ times film thickness of thickest color filter.

6. A liquid crystal display device comprising:

a pair of electrodes which constitute an upper layer and a lower layer with respect to an interlayer insulation film are formed on at least color filters as different layers at respective pixel regions on a liquid-crystal-side surface of one substrate out of respective substrates which are arranged to face each other in an opposed manner by way of liquid crystal from the one substrate side, at two pixel regions which are selected from the respective pixel regions and on which two color filters of different colors are formed, the heights of surfaces of the color filters differ with respect to a surface of one substrate, and the film thickness of the interlayer insulation film is set to satisfy a following formula ¼×film thickness difference of color filter between pixel regions<film thickness difference of interlayer insulation film between pixel regions, <¾×film thickness difference of color filter between pixel regions.

7. A liquid crystal display device according to claim 6, wherein the film thickness of the interlayer insulation film is set to satisfy a following formula film thickness of interlayer insulation film<³⁄₂ times film thickness of thickest color filter.

8. A liquid crystal display device according to claim 6, wherein the film thickness of the interlayer insulation film is set to satisfy a following formula ¼ of film thickness of thinnest color filter< film thickness of interlayer insulation film<

³⁄₂ times film thickness of thickest color filter.

* * * * *